US011208586B2

(12) United States Patent
Mack

(10) Patent No.: US 11,208,586 B2
(45) Date of Patent: *Dec. 28, 2021

(54) HIGH DENSITY, LOW TCT MONOVALENT BRINES AND USES THEREOF

(71) Applicant: Tetra Technologies, Inc., Conroe, TX (US)

(72) Inventor: Arthur G. Mack, Conroe, TX (US)

(73) Assignee: TETRA TECHNOLOGIES, INC., Conroe, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/858,405

(22) Filed: Apr. 24, 2020

(65) Prior Publication Data
US 2020/0255715 A1 Aug. 13, 2020

Related U.S. Application Data

(63) Continuation of application No. 15/468,940, filed on Mar. 24, 2017, now Pat. No. 11,136,486.

(60) Provisional application No. 62/312,876, filed on Mar. 24, 2016.

(51) Int. Cl.
C09K 8/035 (2006.01)
C09K 8/03 (2006.01)
E21B 21/00 (2006.01)
C09K 8/62 (2006.01)
E21B 43/26 (2006.01)

(52) U.S. Cl.
CPC .......... C09K 8/035 (2013.01); C09K 8/03 (2013.01); C09K 8/62 (2013.01); E21B 21/00 (2013.01); E21B 43/26 (2013.01)

(58) Field of Classification Search
CPC . C09K 8/03; C09K 8/035; C09K 8/04; C09K 8/05
See application file for complete search history.

(56) References Cited

U.S. PATENT DOCUMENTS

| | | |
|---|---|---|
| 1,911,195 A | 5/1933 | Kepfer |
| 2,191,312 A | 2/1940 | Cannon |
| 2,898,294 A | 8/1959 | Priest et al. |
| 3,275,552 A | 9/1966 | Kern et al. |
| 4,292,183 A | 9/1981 | Sanders |
| 4,444,668 A | 4/1984 | Walker et al. |
| 4,465,601 A | 8/1984 | Pasztor, Jr. |
| 4,486,340 A | 12/1984 | Glass, Jr. |
| 4,566,976 A | 1/1986 | House et al. |
| 5,076,364 A | 12/1991 | Hale et al. |
| 5,330,683 A | 7/1994 | Sufrin |
| 5,415,230 A | 5/1995 | Fisk, Jr. et al. |
| 5,728,652 A | 3/1998 | Dobson, Jr. |
| 5,846,914 A | 12/1998 | Finkelstein et al. |
| 6,080,704 A | 6/2000 | Halliday et al. |
| 6,100,222 A | 8/2000 | Vollmer et al. |
| 6,124,244 A | 9/2000 | Murphey |
| 6,489,270 B1 | 12/2002 | Vollmer et al. |
| 6,617,285 B2 | 9/2003 | Crews |
| 6,635,604 B1 | 10/2003 | Halliday et al. |
| 6,730,234 B2 | 5/2004 | Symens et al. |
| 6,843,931 B2 | 1/2005 | Sapienza |
| 7,048,961 B2 | 5/2006 | Knauf |
| 7,078,370 B2 | 7/2006 | Crews |
| 7,084,093 B2 | 8/2006 | Crews |
| 7,306,039 B2 | 12/2007 | Wang et al. |
| 7,825,073 B2 | 11/2010 | Welton et al. |
| 7,910,524 B2 | 3/2011 | Welton et al. |
| 7,960,315 B2 | 6/2011 | Welton et al. |
| 8,003,578 B2 | 8/2011 | Monroe et al. |
| 8,030,254 B2 | 10/2011 | Phatak et al. |
| 8,067,342 B2 | 11/2011 | Lin et al. |
| 8,071,059 B2 | 12/2011 | Filippi et al. |
| 8,381,537 B2 | 2/2013 | Morita et al. |
| 8,697,611 B2 | 4/2014 | Zhang et al. |
| 8,853,135 B2 | 10/2014 | Phatak et al. |
| 8,936,111 B2 | 1/2015 | Maghrabi et al. |
| 8,950,492 B2 | 2/2015 | Maghrabi et al. |
| 9,127,192 B2 | 9/2015 | Maghrabi et al. |
| 9,593,276 B2 | 3/2017 | Livanec |

(Continued)

FOREIGN PATENT DOCUMENTS

| | | |
|---|---|---|
| CN | 106928930 A | 7/2017 |
| EP | 0194254 A1 | 9/1986 |

(Continued)

OTHER PUBLICATIONS

Chen, et al.; Effect of Cryoprotectants on Eutectics of NaCl 2H2O/ice and KCl/ice Studied by Temperature Wave Analysis and Differential Scanning Calorimetry; Thermochimica Acta 431 (2005) 106-112; 7 pgs.

The International Search Report and Written Opinion for related PCT application PCT/US2018/057200 dated Dec. 14, 2018. (TETRA1005).

The International Search Report and Written Opinion for related PCT application PCT/US2018/057202 dated Jan. 7, 2019.

The International Search Report and Written Opinion for related PCT application PCT/US2018/057205 dated Dec. 14, 2018. (TETRA1007).

(Continued)

Primary Examiner — Aiqun Li
(74) Attorney, Agent, or Firm — Bracewell LLP; Constance Gall Rhebergen

(57) ABSTRACT

A method of using a suppression factor fluid during a well activity is provided. The method comprising the steps of introducing a suppression factor fluid into a wellbore, the suppression factor fluid comprising an untreated monovalent brine; and a suppression sugar alcohol, the suppression sugar alcohol in an amount operable to achieve a suppression factor, wherein a density upper limitation of the suppression factor fluid is greater than the density upper limitation of the monovalent brine; and completing the well activity in the wellbore, such that the suppression sugar alcohol inhibits crystallization during the well activity.

9 Claims, No Drawings

(56) References Cited

U.S. PATENT DOCUMENTS

| | | |
|---|---|---|
| 9,868,890 B2 | 1/2018 | Alleman |
| 2003/0092581 A1 | 5/2003 | Crews |
| 2004/0124013 A1 | 7/2004 | Wiesner et al. |
| 2005/0038199 A1 | 2/2005 | Wang et al. |
| 2005/0101491 A1 | 5/2005 | Vollmer |
| 2005/0253110 A1 | 11/2005 | Chauhan et al. |
| 2008/0093579 A1 | 4/2008 | Knauf |
| 2008/0269081 A1 | 10/2008 | Lin et al. |
| 2009/0048126 A1 | 2/2009 | Phatak et al. |
| 2010/0016180 A1 | 1/2010 | Scoggins et al. |
| 2010/0093565 A1 | 4/2010 | Phatak et al. |
| 2010/0130388 A1 | 5/2010 | Phatak et al. |
| 2010/0163255 A1 | 7/2010 | Horton et al. |
| 2010/0303737 A1 | 12/2010 | Hurtig |
| 2010/0311621 A1 | 12/2010 | Kesavan et al. |
| 2012/0118569 A1 | 5/2012 | Deville |
| 2013/0098615 A1 | 4/2013 | Perez et al. |
| 2013/0168095 A1 | 7/2013 | Loveless et al. |
| 2013/0231268 A1 | 9/2013 | Ghosh et al. |
| 2014/0148366 A1 | 5/2014 | Reyes Bautista |
| 2014/0221256 A1 | 8/2014 | Holtsclaw |
| 2014/0262283 A1 | 9/2014 | Savari et al. |
| 2014/0352961 A1 | 12/2014 | Dobson, Jr. et al. |
| 2015/0096808 A1 | 4/2015 | Misino et al. |
| 2016/0177698 A1 | 6/2016 | Schultheiss et al. |
| 2016/0208158 A1 | 7/2016 | Monahan et al. |
| 2017/0088762 A1 | 3/2017 | Zhang et al. |
| 2017/0145284 A1 | 5/2017 | Davidson et al. |
| 2017/0158939 A1 | 6/2017 | Chen et al. |
| 2017/0158976 A1 | 6/2017 | O'Rear et al. |
| 2017/0190954 A1 | 7/2017 | Schultheiss et al. |
| 2017/0292055 A1 | 10/2017 | Alleman |
| 2018/0016484 A1 | 1/2018 | Ray et al. |

FOREIGN PATENT DOCUMENTS

| | | |
|---|---|---|
| EP | 2463350 A1 | 6/2012 |
| EP | 1863890 B1 | 10/2014 |
| GB | 2250761 A | 6/1992 |
| GB | 2334279 A | 8/1999 |
| JP | 56098482 A | 8/1981 |
| KR | 20040043935 A | 5/2004 |
| WO | 9821291 A1 | 5/1998 |
| WO | 03064555 A1 | 8/2003 |
| WO | 2004050557 A1 | 6/2004 |
| WO | 2009126548 A2 | 10/2009 |
| WO | 2015068865 A1 | 5/2015 |
| WO | 2016025137 A1 | 2/2016 |
| WO | 2017165754 A1 | 9/2017 |

OTHER PUBLICATIONS

Kaminski, et al., "Clearly Different", Reprinted from Oilfield Technology, Jul. 2012, 4 pgs.

PCT/US2017/023995 International Search Report and Written Opinion dated May 24, 2017; 15 pgs.

PCT/US2017/023996 International Search Report and Written Opinion dated May 24, 2017; 16 pgs.

PCT/US2017/024008 International Search Report and Written Opinion dated May 24, 2017; 16 pgs.

Section B14 Solubility in Non-Aqueous Solvents, Formate Technical Manual, Mar. 1-4, 2013, Version 1, Cabot Specialty Fluids, 4 pgs.

Telang, et al., Effective Inhibition of Mannitol Crystallization in Frozen Solutions by Sodium Chloride, Pharmaceutical Research (Apr. 2003), vol. 20, No. 4, 660-667, 8 pgs.

U.S. Appl. No. 15/791,748 Non-Final Office Action dated Feb. 25, 2019 (21 pages).

HIGH DENSITY, LOW TCT MONOVALENT BRINES AND USES THEREOF

RELATED APPLICATIONS

This application is a continuation of U.S. Non-Provisional application Ser. No. 15/468,940 filed on Mar. 24, 2017, which claims priority from U.S. Provisional Application No. 62/312,876 filed on Mar. 24, 2016. For purposes of United States patent practice, this application incorporates the contents of both the Provisional patent application and Non-Provisional patent application by reference in their entirety.

BACKGROUND

Technical Field

Described are compositions for use as well fluids. More specifically, described are compositions with low true crystallization temperatures and high densities for use as well fluids.

Description of the Related Art

When used as a heavy completion fluid, brines can crystallize if exposed to lower temperatures or higher pressures. As the density of a brine above its eutectic point increases so does the true crystallization temperature (TCT) and pressure crystallization temperature (PCT), which can cause blockage to tubulars in a wellbore on the surface if the fluid crystallizes. Applying pressure to a brine at a density above the eutectic point will lead to an increase in density, which in turn can lead to crystallization.

Crystallization inhibitors can be used to lower the TCT and PCT, but can also result in a reduction of the density of the brine. Zinc, such as in the form of zinc bromide ($ZnBr_2$), can be added to increase the density. However, zinc is a marine pollutant and can cause issues in the processing stage if residual zinc is in the oil sent to the refinery.

In conventional brine systems, typical crystallization inhibitors, such as methanol and ethylene glycol, can lower TCT, but also dramatically lower the density of the brine (making it unsuitable for the original purpose), which means that more solid monovalent salt has to be added to bring the density of the brine back to the operational density. In most cases, enough monovalent salt cannot be added to achieve the operational density and the required crystallization temperature without adding weighting additives, such as zinc bromide.

SUMMARY

Described are compositions for use as well fluids. More specifically, described are compositions with low true crystallization temperatures and high densities for use as well fluids.

In a first aspect, a method of using a suppression factor fluid during a well activity is provided. The method includes the steps of introducing a suppression factor fluid into a wellbore. The suppression factor fluid includes an untreated monovalent brine, and a suppression sugar alcohol. The suppression sugar alcohol is in an amount operable to achieve a suppression factor of at least 0.1, where a density upper limitation of the suppression factor fluid is greater than the density upper limitation of the untreated monovalent brine. The method further includes the step of completing the well activity in the wellbore, such that the suppression sugar alcohol inhibits crystallization during the well activity.

In certain aspects, the untreated monovalent brine is selected from the group consisting of a sodium bromide brine, a sodium chloride brine, a sodium formate brine, a potassium bromide brine, a potassium chloride brine, a potassium formate brine, a lithium bromide brine, a lithium chloride brine, cesium formate brine and combinations thereof. In certain aspects, the suppression sugar alcohol is selected from the group consisting of sorbitol, xylitol, and combinations thereof. In certain aspects, the suppression factor is in the range between 0.1 and 10.

In a second aspect, a composition for use as a suppression factor fluid is provided. The composition includes an untreated monovalent brine, and a suppression sugar alcohol. The suppression sugar alcohol is in an amount operable to achieve a suppression factor of at least 0.1, where the suppression factor fluid has a density upper limitation that is greater than the density upper limitation of the untreated monovalent brine.

In certain aspects, the composition is in the absence of cesium.

In a third aspect, a composition for use as a suppression factor fluid is provided. The composition includes 50% by weight to 99.9% by weight of an untreated monovalent brine, and 0.1% by weight on a dry weight basis to 50% by weight on a dry weight basis of a suppression sugar alcohol.

In a fourth aspect, a method of creating a suppression factor fluid is provided. The method including the steps of adding an amount of a suppression sugar alcohol to a monovalent brine to create a mixture, where the amount of a suppression sugar alcohol is operable to achieve a suppression factor of between 0.1 and 10, and mixing the mixture until the suppression sugar alcohol is dissolved.

In certain aspects, the amount of the suppression sugar alcohol is between 0.1% by weight on a dry weight basis and 50% by weight on a dry weight basis. In certain aspects, the amount of the suppression sugar alcohol is added in a solid form. In certain aspects, the amount of the suppression sugar alcohol is added in an aqueous form. In certain aspects, the method further includes the step of adding additional monovalent salt to the suppression factor fluid after the suppression sugar alcohol after the step of mixing the mixture, such that the additional monovalent salt achieves an operational density of the suppression factor fluid.

DETAILED DESCRIPTION

While the scope will be described with several embodiments, it is understood that one of ordinary skill in the relevant art will appreciate that many examples, variations and alterations to the apparatus and methods described herein are within the scope and spirit. Accordingly, the exemplary embodiments described herein are set forth without any loss of generality, and without imposing limitations.

Embodiments of a suppression factor fluid that includes a monovalent brine and a suppression sugar alcohol and methods of using the suppression factor fluid as a well fluid during a well activity.

As used herein, "crystallization" refers to the formation of crystals in a brine when it cools. Without being bound by a particular theory, crystallization occurs when it is thermodynamically favorable, that is it takes less energy to crystallize than to stay in solution. In other words, the driving force for crystallization is when the free energy of the initial solution is greater than the sum of the free energies of the crystalline phase and the final solution. As an example, crystallization in a well can occur at the mud line due to the mud line temperatures.

As used herein, "well fluid" refers to a fluid that can be used in a wellbore. Well fluids encompass drilling fluids, completion fluids, packer fluids, production fluids, fracturing fluids, and the like in well activities.

As used herein, "well activity" refers to drilling activities, production activities, and completion activities. Examples of well activities include, but are not limited to, drilling, completion, and workover.

As used herein, "stable" or "stabilize" means that when a composition, component, or compound is stable, the composition, component or compound does not degrade, decompose, or precipitate from solution.

As used herein, "true crystallization temperature" or "TCT" refers to the temperature at which crystals form in a brine for a given brine density. The true crystallization temperature is defined as the temperature corresponding to the maximum temperature reached following the super-cooling minimum. In a plot of temperature during a cooling cycle, TCT is the maximum temperature reached following the super-cooling minimum or the inflection point in cases with no super-cooling. If there is no super-cooling TCT will equal first crystal to appear (FCTA). TCT is the measured crystallization temperature nearest the temperature at which a brine will naturally crystallize in pumps, lines, filtration units, and tanks. Further described in API Recommended Practice 13J, *Testing of Heavy Brines*, 5th Ed. October 2014. By way of example, in an untreated monovalent brine containing only a monovalent salt and water, as the brine density changes, the TCT changes. On the salt side of a solubility curve, as density increases (in other words, more salt is added) so does the TCT. In contrast, on the ice side of a solubility curve, below the eutectic point, as density increases, the TCT goes down. Table 1 provides a list of TCT and brine density.

TABLE 1

TCT of various brines at specific densities

| Brine | Brine Density | TCT |
|---|---|---|
| NaBr | 12.3 ppg | 27° F. |
| NaCl | 10.0 ppg | 25° F. |
| KBr | 10.8 ppg | 23° F. |
| KCl | 9.5 ppg | 18° F. |
| NH$_4$Cl | 8.9 ppg | 31° F. |
| KHCOOH | 13.2 ppg | 26° F. |

As used herein, "suppression sugar alcohol" refers to a component derived from the reduction of a saccharide that is useful as a suppression additive in suppressing the true crystallization temperature. Examples of suppression sugar alcohols suitable for use include sorbitol, xylitol, and combinations thereof. Sugar alcohols do not include sugars. Advantageously, the sugar alcohols are biodegradable, exhibit low toxicity and do not bioaccumulate. Without being bound to a particular theory, replacing some of the water in a brine solution with an alcohol can affect the thermodynamic driving force for crystal formation, because water molecules that surround the salt ions play an important role in the thermodynamics of phase transitions in solution. The trapping or release of water molecules has a significant effect on the thermodynamics. In at least one embodiment, the suppression sugar alcohol includes sorbitol in combination with other sugar alcohols. In at least one embodiment, the suppression sugar alcohol includes xylitol in combination with other sugar alcohols. In at least one embodiment, the suppression sugar alcohol includes xylitol and sorbitol in combination with other sugar alcohols.

As used herein, "suppression factor" is a measure of the reduction in TCT relative to the amount of suppression sugar alcohol. The suppression factor is determined by the following equation:

$$\text{suppression factor} = \frac{TCT_{no\ supp\ add} - TCT_{supp\ add}}{\text{suppression additive}} \, / \%  \quad \text{equation (1)}$$

where $TCT_{no\ supp\ add}$ is the TCT of an untreated monovalent brine, $TCT_{supp\ add}$ is the TCT of a divalent brine with a suppression additive added, and % suppression additive refers to the amount of suppression additive added to the divalent brine. As used herein, "density upper limitation" refers to the density that can be achieved in a brine fluid while avoiding crystallization at well conditions, including mud line temperature and pressure. The density is a measure of the loading of monovalent salt in an aqueous fluid, measured in pounds per gallon (ppg). For a sodium bromide brine (solution of only sodium bromide and water), the density upper limitation is about 12.5 ppg. For a sodium chloride brine (a solution of only sodium chloride and water), the density upper limitation is about 10.0 ppg. Above the density upper limitation crystallization can occur.

As used herein, "operational density" refers to the desired or target density of a well fluid as required for a particular well activity.

As used herein, "solubility" refers to the measure of how much of a component can be dissolved in a fluid.

As used herein, "untreated monovalent brine" refers to a monovalent brine in the absence of a suppression additive, where the suppression additive suppresses the TCT.

Embodiments provide a suppression factor fluid that has a lower TCT than an untreated monovalent brine at a similar density. The addition of a suppression sugar alcohol to the untreated monovalent brine results in minimal loss in density as compared to the untreated monovalent brine. Advantageously, the addition of a suppression sugar alcohol to a monovalent brine can lower the TCT of the monovalent brine for a given brine density. Embodiments can provide suppression factor fluids with density upper limitations of greater than 13.9 ppg and a TCT of at least 3° F. below that of an untreated divalent brine of the same density. In at least one embodiment, the suppression factor fluid composition can suppress the thermodynamic event that leads to crystallization and allow more monovalent salts to be added to the solution, than compositions in the absence of a suppression sugar alcohol. The suppression factor fluids are stable (do not crystallize) even though the salt content in the fluid is greater than the saturation point of salt in water at any given temperature. Advantageously, the embodiments of the suppression factor fluids provide fluids with densities that expand beyond conventional fluid densities used in well activities, while suppressing TCT, addressing a need in industry.

A suppression factor fluid for use in a well activity is provided. The composition of the suppression factor fluid includes an untreated monovalent brine and a suppression sugar alcohol.

The untreated monovalent brine can be any aqueous solution containing at least one monovalent salt having a density upper limitation suitable for use in the well activity. The untreated monovalent brine can be selected based on the well activity to be performed, the wellbore conditions, the operational density, and the density upper limitation.

Examples of untreated monovalent brines include a sodium bromide (NaBr) brine, a sodium chloride (NaCl) brine, a sodium formate (HCOONa) brine, a potassium bromide (KBr) brine, a potassium chloride (KCl) brine, a potassium formate (HCOOK) brine, a lithium bromide (LiBr) brine, a lithium chloride (LiCl) brine, a cesium formate (HCOOCs) brine and combinations thereof. The monovalent brine has a true crystallization temperature related to the density upper limitation.

The suppression sugar alcohol is added in amount operable to achieve a suppression factor of at least 0.1, and alternately between 0.1 and 10. In at least one embodiment, the suppression sugar alcohol is added in an amount operable to achieve a TCT suppression of at least 3° F. As used herein, "suppression" means reduction, in other words, a TCT suppression is a reduction of the TCT. In at least one embodiment, the suppression sugar alcohol is added to the monovalent brine in a solid form. The solid form of a suppression sugar alcohol is free flowing and permits for easier handling, does not require storage tanks and pumps and can be accommodated at locations, including remote locations, with space restrictions. In at least one embodiment, the suppression sugar alcohol is added to the monovalent brine in an aqueous form. In at least one embodiment, the suppression sugar alcohol is added to the monovalent brine in an aqueous form and calculated on a dry weight basis. In at least one embodiment, the suppression sugar alcohol is sorbitol and can be added to the monovalent brine as an aqueous solution containing 70% by weight on a dry weight basis sorbitol and 30% by weight water. The amount of suppression sugar alcohol added can be between 0.1 percent (%) by weight on a dry weight basis and 50% by weight on a dry weight basis, alternately between 1% by weight on a dry weight basis and 50% by weight on a dry weight basis, alternately between 10% by weight on a dry weight basis and 50% by weight on a dry weight basis, alternately between 10% by weight on a dry weight basis and 20% by weight on a dry weight basis, alternately between 20% by weight on a dry weight basis and 30% by weight on a dry weight basis, alternately between 30% by weight on a dry weight basis and 40% by weight on a dry weight basis, and alternately between 40% by weight on a dry weight basis and 50% by weight on a dry weight basis.

The suppression factor fluid has a density upper limitation. The density upper limitation can be greater than 13 ppg. In at least one embodiment, the density upper limitation of the suppression factor fluid is greater than 12.5 ppg.

The true crystallization temperature of the suppression factor fluid for a given density upper limitation is lower than the true crystallization temperature of the monovalent brine at the same density upper limitation. The true crystallization temperature of the suppression factor fluid can be between −40° F. and 70° F.

In at least one embodiment, the suppression factor fluid is in the absence of cesium, in any form. In at least one embodiment, the suppression factor fluid is in the absence of a formate. In at least one embodiment, the suppression sugar alcohol and the suppression factor fluid are in the absence of glycols, including, for example, ethylene glycol and propylene glycol.

The suppression factor fluid is created by adding an amount of a suppression sugar alcohol to an untreated monovalent brine to create a mixture. The amount of the suppression sugar alcohol is operable to achieve a suppression factor of between 0.1 and 10, and alternately of up to 10. The mixture can be mixed until the suppression sugar alcohol is dissolved. As used herein, "mixed" or "mix" includes any form of combining a liquid and a solid, such as stirring, shaking, agitating, blending, and any equipment capable of creating a mixed fluid can be used. In at least one embodiment, the density of the monovalent brine is higher than the operational density of the suppression factor fluid, such that when the suppression sugar alcohol is added the density of the suppression factor fluid is reduced to the operational density. In at least one embodiment, additional monovalent salt can be added to the suppression factor fluid after the suppression sugar alcohol is added to increase or regain the desired density.

In at least one embodiment, the suppression factor fluids have densities on the salt side of a solubility curve, that is densities above the eutectic point. On the salt side of a solubility curve, as density increases (i.e., more salt is added) so does the TCT. In contrast, on the ice side of a solubility curve, below the eutectic point, as density increases, the TCT goes down.

In at least one embodiment, the suppression sugar alcohol is sorbitol. The density of sorbitol is about 12.42 ppg. In at least one embodiment, the suppression factor fluid includes a sodium brine and sorbitol as the suppression sugar alcohol and has a density upper limitation of 13.9 ppg.

The density of xylitol is 12.68 ppg.

A method of using a suppression factor fluid during a well activity is provided. The suppression factor fluid is introduced into a wellbore. The well activity is completed, such that during the well activity, the suppression sugar alcohol inhibits crystallization.

In at least one embodiment, the suppression factor fluid can include additives used in well fluids. In at least one embodiment, an additive that can be added to the suppression factor fluid includes a stabilization compound to inhibit degradation of the suppression sugar alcohol at bottom hole temperatures, where the stabilization compound is effective to inhibit degradation at bottom hole temperatures greater than 250° F. Examples of stabilization compounds suitable for use include, amine bases, such as monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100 (available from Huntsman Corporation), piperazine, diethylhydroxylamine (DEHA), diethylaminoethanol (DEAE), dimethylethanolamine (DMEA), methoxypropylamine (MOPA), morpholine, n-aminopropylmorpholine (APM), 4-[2-hydroxyethyl]morpholine, diglycolamine, N-[3-aminopropyl]diethanolamine, aminoethylethanolamine (AEEA), and combinations thereof.

EXAMPLES

Example 1

A sample of a suppression factor fluid was created. To 500 g of a stock NaBr solution at 12.5 ppg, 241 g of sorbitol was added in various increments and the results on mixing were observed, as shown in Table 2. The final suppression factor fluid contained 30.6% by weight NaBr, 36.8% by weight water, and 32.6% by weight sorbitol. The density was 12.42 ppg. The TCT was less than 30° F., and the viscosity was 20.3 cP.

TABLE 2

Observations on addition of sorbitol to Sample in Example 1.

| Weight Added (g) | Observation | Wt % |
|---|---|---|
| 105 | Stirring, no real exotherm, started to warm, but solution cleared quickly | 17.4 |
| 57 | Went clear | 24.5 |
| 33 | Went clear | 28.0 |
| 46 | | 32.6 |
| Total Weight: 241 g | | |

Example 2

Example 2 compared different suppression additives. The untreated monovalent brine was a 12.5 ppg sodium bromide brine, also used as Sample 1. Sample 2 was prepared by adding the amount of sorbitol indicated in Table 3 to the 12.5 ppg sodium bromide brine and the final density was measured. Samples 3-7 were prepared by adding the amount of suppression additive indicated in Table 3 to the 12.5 ppg sodium bromide brine and additional solid sodium bromide was added to achieve the final density in indicated in Table 3. The suppression factor for sample 2 and for sample 7 was calculated.

TABLE 3

Compositions of Samples 1-7 in Example 2.

| | Suppression Additive | Amount of Suppression Additive (% by weight) | Final Density (ppg) | TCT (° F.) | Viscosity (cP) | Suppression Factor |
|---|---|---|---|---|---|---|
| Sample 1 | None | 0 | 12.5 | 37 | | 0 |
| Sample 2 | Sorbitol | 32.6 | 12.42 | <−30 | 20.3 | >1.93 |
| Sample 3 | Sorbitol | 45.1 | 13.02 | 10 | 129 | N/A |
| Sample 4 | Sorbitol | 33.2 | 13.12 | 18.4 | 35.8 | N/A |
| Sample 5 | Sorbitol | 31.1 | 13.53 | 60 | 45 | N/A |
| Sample 6 | Sorbitol | 39.8 | 13.86 | 57 | 384 | N/A |
| Sample 7 | Glycerol | 9.2 | 12.5 | 42 | | −0.43 |

A suppression factor could not be calculated for samples 2-6 because it was not possible to measure a TCT for an untreated sodium bromide brine at a density above 13.0 ppg. At densities above 13.0 ppg, the sodium bromide in an untreated sodium bromide brine will not stay in solution at temperatures below 70° F.

Addition of sorbitol, as shown in Table 3, can result in a large drop in TCT (see Sample 2) and at 12.42 ppg NaBr, there is hardly any loss in density from the initial 12.5 ppg density. The data also shows that it is possible to achieve densities greater than 13 ppg with a TCT less than 20° F. (see sample 3 and 4). Even higher densities up to 13.9 ppg can be achieved with a TCT less than 60° F. (samples 5 and 6). Glycerol increased the TCT of the sodium bromide brine as shown in Sample 7. A suppression factor fluid can be created in consideration of the needed operational density and the temperature of the well, for example, the mud line temperature.

Example 3

Example 3 was a comparison of the suppression factor of sorbitol and xylitol at various loadings in a NaBr brine. The results show that sorbitol is slightly better than xylitol at suppressing the TCT of sodium bromide brines.

TABLE 4

Effect of sorbitol and xylitol on TCT of sodium bromide brine

| | Density (lb/gal) | Suppression Sugar Alcohol | TCT (° F.) | Suppression Factor |
|---|---|---|---|---|
| Sample 1 | 13.02 | None | 80 | 0 |
| Sample 2 | 12.99 | 15 wt % sorbitol | 51 | 2.1 |
| Sample 3 | 13.03 | 20 wt % sorbitol | 50 | 1.5 |
| Sample 4 | 13.00 | 25 wt % sorbitol | 36 | 1.8 |
| Sample 5 | 13.00 | 30 wt % sorbitol | 21 | 2.0 |
| Sample 6 | 12.98 | 15 wt % xylitol | 57 | 1.5 |
| Sample 7 | 13.00 | 20 wt % xylitol | 53 | 1.4 |
| Sample 8 | 13.01 | 25 wt % xylitol | 41 | 1.6 |
| Sample 9 | 13.00 | 30 wt % xylitol | 31 | 1.63 |

Example 4

Example 4 shows the effect of various loading sorbitol on potassium formate brines. The compositions are in Table 5.

TABLE 5

Effect of sorbitol on TCT of potassium formate brines

| | Density (lb/gal) | Sorbitol (% by weight) | TCT (° F.) | Suppression Factor |
|---|---|---|---|---|
| Sample 1 | 13.2 | None | 26 | 0 |
| Sample 2 | 12.2 | 5 | 19 | 1.4 |
| Sample 3 | 13.2 | 10 | 14 | 1.2 |
| Sample 4 | 13.5 | 0 | 84 | 0 |
| Sample 5 | 13.5 | 5 | 78 | 1.2 |
| Sample 6 | 13.5 | 10 | 80 | 0.4 |

Although the embodiments have been described in detail, it should be understood that various changes, substitutions, and alterations can be made hereupon without departing from the principle and scope. Accordingly, the scope should be determined by the following claims and their appropriate legal equivalents.

The singular forms "a," "an," and "the" include plural referents, unless the context clearly dictates otherwise.

Optional or optionally means that the subsequently described event or circumstances can or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

As used herein and in the appended claims, the words "comprise," "has," and "include" and all grammatical variations thereof are each intended to have an open, non-limiting meaning that does not exclude additional elements or steps.

As used herein, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope.

What is claimed is:

1. A composition for use as a suppression factor fluid, the composition comprising:
   50% by weight to 95% by weight of an untreated monovalent brine;
   5% by weight on a dry weight basis to 50% by weight on a dry weight basis of a suppression sugar alcohol, the suppression sugar alcohol in an amount operable to achieve a suppression factor of at least 1, wherein the suppression sugar alcohol is selected from the group consisting of sorbitol, xylitol, and combinations thereof;
   a stabilization compound, wherein the stabilization compound is operable to inhibit degradation of the suppression sugar alcohol, wherein the stabilization compound comprises an amine base, wherein the amine base is selected from the group consisting of monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100 (available from Huntsman Corporation), piperazine, diethylhydroxylamine (DEHA), diethylaminoethanol (DEAE), dimethylethanolamine (DMEA), methoxypropylamine (MOPA), morpholine, naminopropylmorpholine (APM), 4-[2-hydroxyethyl]morpholine, diglycolamine, N-[3-aminopropyl]diethanolamine, aminoethylethanolamine (AEEA), and combinations thereof,
   wherein the suppression factor fluid has a density upper limitation that is greater than the density upper limitation of the untreated monovalent brine, wherein a density of the suppression factor fluid is greater than the eutectic point of a solubility curve, wherein the suppression factor fluid is operable for use as a well fluid, wherein the suppression factor fluid inhibits crystallization during a well activity.

2. The composition of claim 1, wherein the untreated monovalent brine is selected from the group consisting of a sodium bromide brine, a sodium chloride brine, a sodium formate brine, a potassium bromide brine, a potassium chloride brine, a potassium formate brine, a lithium bromide brine, a lithium chloride brine, cesium formate brine and combinations thereof.

3. The composition of claim 1, wherein the composition is in the absence of cesium.

4. The composition of claim 1, wherein the suppression factor fluid is in the absence of glycols.

5. A method of creating a suppression factor fluid, the method comprising the steps of:
   adding an amount of between 5% by weight on a dry weight basis and 50% by weight on a dry weight basis of a suppression sugar alcohol to an untreated monovalent brine to create a mixture, wherein the amount of a suppression sugar alcohol is operable to achieve a suppression factor of between 1 and 10, wherein the mixture comprises between 50% by weight and 95% by weight of the untreated monovalent brine, wherein the suppression sugar alcohol is selected from the group consisting of sorbitol, xylitol, and combinations thereof;
   mixing the mixture until the suppression sugar alcohol is dissolved; and
   adding an amount of a stabilization compound, wherein the stabilization compound is operable to inhibit degradation of the suppression sugar alcohol, wherein the stabilization compound comprises an amine base,
   wherein the suppression factor fluid is operable for use as a well fluid,
   wherein the suppression factor fluid inhibits crystallization during a well activity.

6. The method of claim 5, wherein the amount of the suppression sugar alcohol is added in a solid form.

7. The method of claim 5, wherein the amount of the suppression sugar alcohol is added in an aqueous form.

8. The method of claim 5, further comprising the step of adding additional monovalent salt to the suppression factor fluid after the suppression sugar alcohol after the step of mixing the mixture, such that the additional monovalent salt achieves an operational density of the suppression factor fluid.

9. The method of claim 5, wherein the amine base is selected from the group consisting of monoethanolamine (MEA), diethanolamine (DEA), triethanolamine (TEA), ethylenediamine (EDA), diethylenetriamine (DETA), triethylenetetramine (TETA), tetraethylenepentamine (TEPA), pentaethylenetetramine (PETA), pentaethylenehexamine (PEHA), aminoethylpiperazine (AEP), ethyleneamine E-100 (available from Huntsman Corporation), piperazine, diethylhydroxylamine (DEHA), diethylaminoethanol (DEAE), dimethylethanolamine (DMEA), methoxypropylamine (MOPA), morpholine, naminopropylmorpholine (APM), 4-[2-hydroxyethyl]morpholine, diglycolamine, N-[3-aminopropyl]diethanolamine, aminoethylethanolamine (AEEA), and combinations thereof.

* * * * *